US007213744B2

(12) United States Patent
Michelsen et al.

(10) Patent No.: US 7,213,744 B2
(45) Date of Patent: May 8, 2007

(54) REGULATED WIRE TRANSFER COMPLIANCE SYSTEMS AND METHODS

(75) Inventors: Michael J. Michelsen, Arvada, CO (US); Joseph Cachey, Denver, CO (US); Phyllis Skene-Stimac, Parker, CO (US)

(73) Assignee: The Western Union Company, Englewood, CO (US)

( * ) Notice: Subject to any disclaimer, the term of this patent is extended or adjusted under 35 U.S.C. 154(b) by 305 days.

(21) Appl. No.: 10/940,417

(22) Filed: Sep. 13, 2004

(65) Prior Publication Data

US 2006/0054683 A1    Mar. 16, 2006

(51) Int. Cl.
*G06Q 40/00*    (2006.01)
(52) U.S. Cl. .......................... 235/379; 235/380; 705/17
(58) Field of Classification Search ................ 235/379, 235/380, 487; 705/17, 44
See application file for complete search history.

(56) References Cited

U.S. PATENT DOCUMENTS 5,677,955 A * 10/1997 Doggett et al. ............... 705/76
6,105,007 A * 8/2000 Norris ......................... 705/38
6,547,132 B1   4/2003 Templeton et al.
6,704,039 B2 * 3/2004 Pena ....................... 348/14.01
2004/0039702 A1   2/2004 Blair et al.

* cited by examiner

*Primary Examiner*—Steven S. Paik
(74) *Attorney, Agent, or Firm*—Townsend and Townsend and Crew LLP (57) ABSTRACT

A method of facilitating a money transfer to a region for which compliance with a requirement requires execution of a document. The method includes receiving transaction information at a host computer system from a transaction processing device at a transaction origination location. The transaction information relates to a money transfer to the region. The method also includes storing at least a portion of the transaction information as a money transfer record. The record includes a field whose value indicates the status of compliance with the requirement. The method also includes receiving an image of at least a portion of the document, evaluating the document to determine whether the document evidences compliance with the requirement, setting the value of the field to indicate compliance with the requirement, and completing the money transfer, upon request or a recipient, if the value of the field indicates compliance with the requirement.

20 Claims, 4 Drawing Sheets

FIG. 1A

REMITTANCE AFFIDAVIT — 160

164

162

FAX AGENT COPY IMMEDIATELY TO 1-866-555-1234 — 176

MTCN ⬜⬜⬜⬜⬜⬜⬜⬜⬜⬜ — 166

I, _________, DECLARE AND STATE THAT THE FOLLOWING IS TRUE AND ACCURATE TO THE BEST OF MY KNOWLEDGE:

YO, _________, DECLARO, Y AFIRMO QUE, A MI CONOCIMIENTO, LO SIGUIENTE ES VERIDICO Y CORRECTO:

168

174

SENDER INFORMATION (DE REMITENTE):

170

My Relation to Payee
(Relacion at Beneficiario): _________
Street Address
(Direccion): _________
City, State, and Zip Code
(Ciudad, Estado, Sona Postal): _________
Telephone Number
(Numero de Telefono: _________
Mother's Maiden Name
(Apellido de soltera de su madre): _________
Date of Birth of Remitter
(Fecha de nacimiento del remitente): _________
SIGNATURE OF REMITTER
(FIRMA DEL REMITENTE):
_________

172

WITNESSED BY EMPLOYEE OF REMITTING AGENCY (FIRMA DE TESTIGO DEL EMPLEADO DEL LA AGENCIA REMITENTE):

WITNESSED BY EMPLOYEE OF REMITTING AGENCY
(FIRMA DE TESTIGO DEL EMPLEADO DEL LA AGENCIA REMITENTE):

Signature (Firma)

Date (Fecha):

Name of Remitting Agency
(Nombre de la Agencia Remitente):

REGULATED WIRE TRANSFER COMPLIANCE SYSTEMS AND METHODS

BACKGROUND OF THE INVENTION

The present invention relates generally to money transfer systems. More specifically, the present invention relates to money transfer systems having a compliance verification arrangement and associated methods.

Many people use the services of money transfer service providers to send funds to other people or purchase negotiable instruments such as money orders and travelers checks. Electronic communication and financial services networks now allow such transactions to have a nearly global reach. Increasingly, however, various laws and regulations impose requirements and/or limitations on money transfers. As a result, money transfer service providers often are obligated to demonstrate compliance with these requirements. Thus, systems and methods are needed that assist money transfer service providers to comply with regulations relating to their services.

BRIEF SUMMARY OF THE INVENTION

Embodiments of the invention thus provide a method of facilitating a money transfer to a region for which compliance with a requirement requires execution of a document. The method includes receiving transaction information at a host computer system from a transaction processing device at a transaction origination location. The transaction information relates to a money transfer to the region. The method also includes storing at least a portion of the transaction information as a money transfer record. The record includes a field whose value indicates the status of compliance with the requirement. The method also includes receiving an image of at least a portion of the document, evaluating the document to determine whether the document evidences compliance with the requirement, setting the value of the field to indicate compliance with the requirement, and completing the money transfer, upon request or a recipient, if the value of the field indicates compliance with the requirement.

In some embodiments, receiving an image of at least a portion of the document includes receiving, as part of the transaction information, at least a digital signature of a money transfer originator. Receiving an image of at least a portion of the document may include receiving at least an electronically-captured signature image of a money transfer originator. Receiving an image of at least a portion of the document may include receiving a facsimile of at least a portion of the document, in which case the method may include reviewing the document for evidence of compliance with the requirement. Evaluating the document to determine whether the document evidences compliance with the requirement may include using an image analysis device to review the document. The image analysis device may be a facsimile machine, a computer, and/or the like. Evaluating the document to determine whether the document evidences compliance with the requirement may include a compliance review specialist reviewing the document. The document may include hand-written content in which case evaluating the document to determine whether the document evidences compliance with the requirement may include evaluating the meaning of the hand-written content. The document may include hand-written content in which case evaluating the document to determine whether the document evidences compliance with the requirement may include evaluating only the presence of the hand-written content.

In further embodiments, a system for performing a wire transfer to a region for which compliance with a requirement requires execution of a document includes a host computer system, an image receiving arrangement, and an interface between the image receiving arrangement and the host computer system. The host computer system includes programming that programs the host computer system to receive transaction information from a transaction processing device at a transaction origination location and store at least a portion of the transaction information as a money transfer record. The transaction information relates to a money transfer to the region. The record includes a field whose value indicates the status of compliance with the requirement. The image receiving arrangement is configured to receive an image of at least a portion of the document and evaluate the document to determine whether the document evidences compliance with the requirement. through the interface, the image receiving arrangement can set the value of the field to indicate compliance with the requirement.

In some embodiments, a computer-readable medium has stored thereon computer-executable instructions for performing a method of facilitating a wire transfer to a region for which compliance with a requirement requires execution of a document. The instruction include instruction for receiving transaction information from a transaction processing device at a transaction origination location, storing at least a portion of the transaction information as a money transfer record, receiving at a compliance verification location an image of at least a portion of the document, evaluating the document to determine whether the document evidences compliance with the requirement, and setting the value of the field to indicate compliance with the requirement. The transaction information relates to a money transfer to the region. The record includes a field whose value indicates the status of compliance with the requirement.

In still other embodiments, a system for performing a wire transfer to a region for which compliance with a requirement requires execution of a document includes means for receiving transaction information from a transaction processing device at a transaction origination location, means for storing at least a portion of the transaction information as a money transfer record, means for receiving an image of at least a portion of the document, means for evaluating the document to determine whether the document evidences compliance with the requirement, and means for setting the value of the field to indicate compliance with the requirement. The transaction information relates to a money transfer to the region. The record includes a field whose value indicates the status of compliance with the requirement.

In still further embodiments, a method of facilitating a transfer of value for which compliance with a requirement requires execution of a document includes receiving transaction information at a host computer system from a transaction processing device at a transaction origination location, storing at least a portion of the transaction information as a value transfer record, receiving at a compliance verification location an image of at least a portion of the document, evaluating the document to determine whether the document evidences compliance with the requirement, processing the record in a first manner only if the document evidences compliance with the requirement, and processing the record in a second manner if the document evidences non-compliance with the requirement. The first manner may include using the transaction record to complete the transfer and the second manner may include rejecting the transfer.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the present invention, money transfer service providers employ systems and methods to improve efforts to comply with requirements related to money transfers. "Requirements" may result from laws, regulations, ordinances, and the like that restrict, limit, prohibit, or otherwise affect money transfers. One example of such a requirement relates to money transfers to Communist countries, states, providences, and the like (hereafter referred to collectively as "regions"). Money transfers to such regions may be restricted in amount, frequency, relationship between sending and receiving parties, and the like. The Office of Foreign Asset Control (OFAC) regulates these transfers, in part by requiring execution of an acknowledgement document. The requirement may require the document to be executed by a party to a money transfer, an agent, associate, or employee of the money transfer service provider, and/or the like. This is but one example of a requirement; many others are possible.

Herein, "provider" or "service provider" will refer to a money transfer service provider. For example, "provider" may refer to an entity such as Western Union of Englewood, Colo., whose money transfer service is well known. Additionally, "associate" will refer to entities that a money transfer service provider may enlist to accomplish the service. For example, third parties, such as merchants, financial institutions, and the like may be "associates." Herein "attendant" will refer to someone with whom a customer interacts in the transaction process. For example, an attendant may be an employee of a provider or associate. An attendant typically operates a transaction processing device, entering information received from the customer and/or related to a transaction. Further, although the phrase "money transfer" will be used herein to refer to the type of service provided, that phrase will be understood to mean any financial transaction involving "value," which may include money, credits, customer loyalty points, other units of measure, and the like.

Although embodiments of the present invention will be described primarily in the context of money transfers, other types of transactions also may benefit from the teachings herein. Thus, transactions to which the present invention applies may include money order purchases and/or redemptions, traveler's check purchases and/or redemptions, sending money to a recipient, receiving money from a sender, and the like.

The process of "wiring" money is well known. Briefly, a sender presents himself to a service provider or associate and provides value, usually cash, to an attendant. Some service providers now even allow senders to transfer money by logging on to a web site and initiating money transfers using credit cards or other accounts. In either case, in some embodiments information is entered into a record that is received at a host computer system. The record includes information that identifies the sender, the recipient, and the amount of money being transferred, among other things. The recipient then presents himself to a receive site of a provider or associate to obtain the money or other value. An attendant at the receive site verifies the identity of the receiver and gives the receiver the value.

At the sending end of the transaction, the transaction information may be collected in any number of ways. In some cases, the information is collected by a point-of-sale device specifically designed for money transfer transactions. The device may be operated by an attendant employed by the provider or an associate. In another case, the information may be collected using a computing device running application software specifically designed for money transfer transactions. In yet another case, the information may be collected by phone when an attendant contacts a customer service representative (CSR) of the provider. The attendant is able to verify the sender's information and collect funds while the CSR enters the information into a transaction record. It also may be the case that the transaction is initiated by an associate who then must contact a CSR because the transaction exceeds certain thresholds. In yet another example, the customer provides some information to a CSR at a remote location while also entering some information into a transaction processing device by, for example, "swiping" a card through a reader on the device. Other examples are possible.

For cases in which compliance with a requirement must be demonstrated through the execution of a document, the attendant and/or the customer does so by completing a paper document, completing an electronic document, or the like. If a paper document is completed, the document may be faxed, or scanned and emailed to a compliance verification location. If an electronic document is completed, the essential parts, including a digital signature, may be sent as part of the transaction information.

At the compliance verification location, the document or document parts are evaluated. The evaluation may be by a compliance verification specialist, by software, possibly using optical character recognition, or the like. The evaluation may merely include determining whether the compliance document has been completed or may include a substantive evaluation of the compliance document and/or other portion of the transaction record. Depending on the outcome of the evaluation, the transaction record may be appropriately annotated or routed and the transaction completed accordingly. In some cases completing the transaction involves notifying the sender that the transaction failed a compliance evaluation. The sender may be given an opportunity to correct the problem that caused the transaction to fail the compliance evaluation. In others cases, completing the transaction involves dispensing funds to a recipient in the regulated region.

Figure 1A:
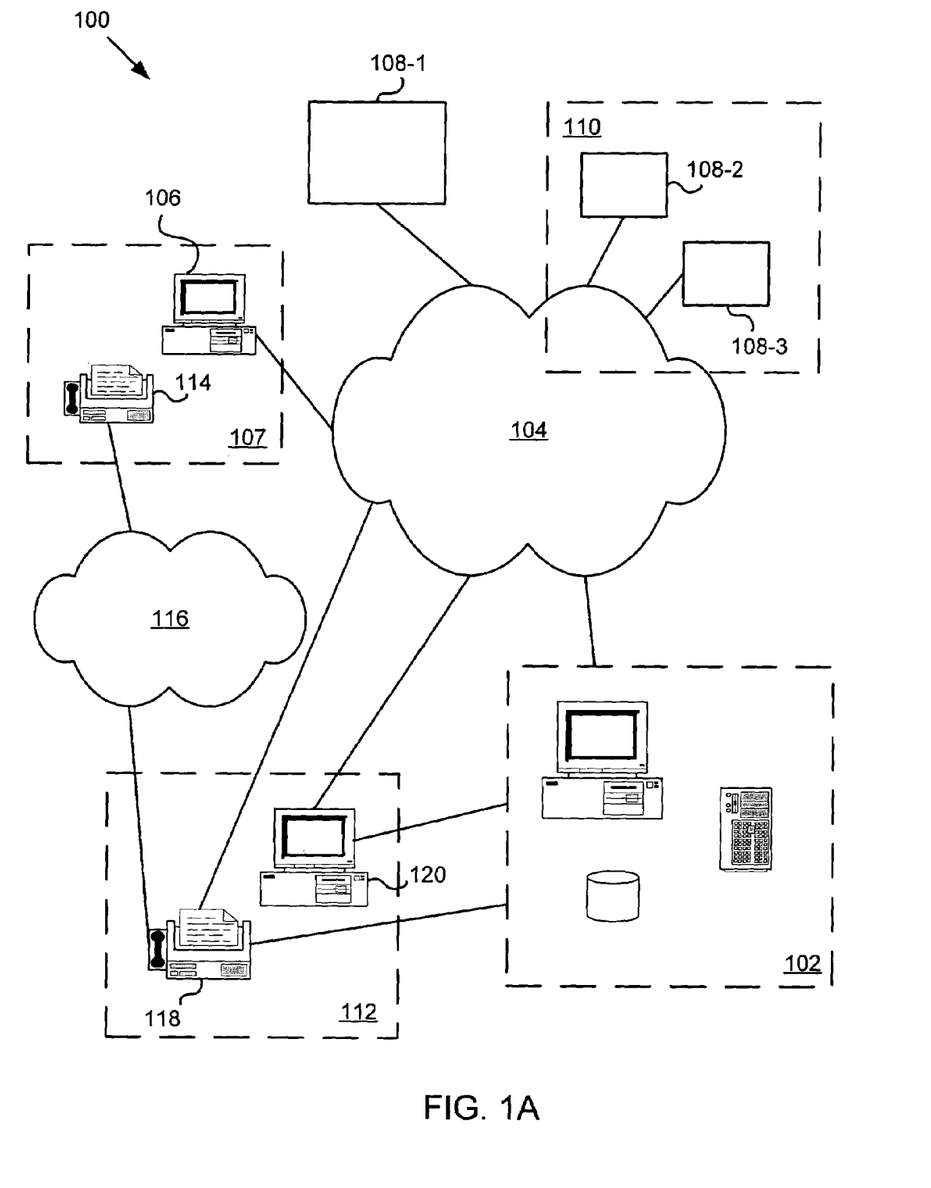
FIG. 1A illustrates a money transfer system according to embodiments of the invention.

Having described embodiments of the invention generally, attention is directed to FIG. 1A, which illustrates a money transfer system 100 according to embodiments of the present invention. Those skilled in the art will appreciate that the system 100 is merely exemplary of a number of possible embodiments of the invention. The system 100 includes a host computer system 102 and a network 104. The host computer system 102 may include, for example, server computers, personal computers, workstations, web servers, and/or other suitable computing devices. The host computer system 102 includes application software that programs the host computer system 102 to perform one or more functions according to the present invention. For example, application software resident on the host computer system 102 may program the host computer system 102 to process money transfer records according to embodiments of the present invention. The host computer system 102 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 102 may be fully located within a single facility or distributed geographically, in which case a network may be used to integrate the host computer system 102. Many other examples are possible and apparent to those skilled in the art in light of this disclosure.

The network 104 may be the Internet, an intranet, a wide area network (WAN), a local area network (LAN), a virtual private network, any combination of the foregoing, or the like. The network 104 may include both wired and wireless connections, including optical links. In some embodiments, the network 104 is a transaction processing network. Through the network 104, transaction devices communicate with the host computer system 102.

The system 100 also includes one or more transaction processing devices 106. Essentially, transaction processing devices 106 are terminals for receiving transaction information and sending the information to a host computer system. For example, a transaction processing device 106 may receive transaction information by capturing it from a card using a reader integral to or associated with it. A transaction processing device 106 also may receive information from an attendant or customer via a keypad, keyboard, and/or other input device. In some embodiments, transaction processing devices include signature capture pads or the like for capturing a mark of an attendant or customer. Other examples are possible. In some embodiments, a transaction processing device is a Point-of-Sale (POS) device such as those described more fully described in U.S. patent application Ser. No. 09/634,901, filed on Aug. 8, 2000 (now U.S. Pat. No. 6,547,132), the entire disclosure of which is incorporated herein by reference for all purposes. Transaction processing devices also may be computing devices programmed to receive money transfer information from customers or attendants. Transaction processing devices 106 typically are located at associate or provider locations 107 offering money transfer services.

In some embodiments, transaction processing devices 106 comprise Customer Service Representative (CSR) computers. CSR computers may be located, for example, at a call center operated by the service provider or an associate.

The system 100 also includes one or more receiving sites 108 from which customers may receive funds. The receive sites 108 may be associate locations equipped with a transaction processing device 106. The receive sites also may be automated teller machines, kiosks (which are more fully described in U.S. patent application Ser. No. 10/225,410, filed on Aug. 20, 2002, the entire disclosure of which is incorporated herein by reference for all purposes), merchant store fronts, bank accounts, stored value accounts, and/or the like.

According to embodiments of the present invention, a customer presents himself to a transaction origination location 107. The location may be equipped with a transaction processing device 106. The location may be operated by the provider or an associate. An attendant receives transaction and personal information from the customer. The attendant also enters the information into the transaction device. In the process, the attendant may need to enter his own identification information to enable the device. If necessary, the attendant contacts a CSR to complete the transaction. The attendant also collects the money from the customer.

Once the transaction information is entered into a transaction processing device 106, the transaction information is transmitted to the host computer system 102 where it is entered into a transaction record. Upon request by a recipient having appropriate information and/or identification, the transaction record is consulted, for example by a device at a receive site 108. If certain requirements are met, funds are dispensed to the recipient. Those skilled in the art appreciate that this is but one possible example of a process for transferring funds.

In some cases, a customer wishes to transfer money to a regulated region 110. A regulated region may be a country, a state, a providence, or the like. The regulated region may include a portion of the network 104 and one or more receive sites 108-2 and 108-3. In certain embodiments, money transfers to the regulated region require the sender, and in some cases the attendant, to complete a document that acknowledges awareness of requirements related to transfers to the regulated region and/or attests to compliance with the requirement. In some cases, the document must be completed before funds may be dispensed to a recipient in a regulated region 110. In a specific example, the sender attests to not having transferred more than a threshold amount of money to a household in the regulated region in a particular period of time.

According to embodiments of the invention, the compliance document may be completed by signing a paper copy, an electronic copy, or the like. In some embodiments, the transaction processing device includes a signature capture pad or the like that the sender signs after reading and/or completing certain portions of the document. The signature image may be included as part of the transaction information and becomes part of the transaction record at the host computer system.

In other embodiments, the sender completes a paper form and the attendant sends an image of the form (or the form itself via regular mail) to a compliance verification location 112. This may be accomplished using an imaging device 114 at the transaction origination location 107. The imaging device may be a facsimile machine, a scanner, or the like. The image of the document is then sent, via a network 116 to the compliance verification location 112. The network 116 may be a portion of the network 104 or may be a separate network such as the Internet or a Public Switched Telephone Network (PSTN). The image is received at the compliance verification location 112 by an image receiving device 118. The image receiving device 118 may be a facsimile machine, a computer, or the like. The compliance verification location 112 may be located at the same location as the host computer system 102 or at a different location. If different locations, the two may be in direct communication or in communication via the network 104.

In some embodiments, the image of the document (or the document itself) is viewed by a compliance verification specialist who determines whether the document satisfies the requirement. In some embodiments, the image receiving device 118 is programmed to evaluate the image and determine whether the document satisfies the requirement. In some embodiments, the image verification specialist views the image(s) captured by the capture device and determines whether the requirement has been satisfied. In some embodiments, software at the host computer system and/or the compliance verification location views the image(s) captured by the capture device and determines whether the requirement has been satisfied. Many other examples are possible.

To further facilitate compliance with the requirement, the transaction record may include a field whose value indicates the status of compliance. For example, the field may be set initially to a "0" to indicate that the document has not been completed and/or verified. After the compliance verification specialist, the image receiving device, or the software at the host computer system determines that the requirements has been satisfied, the value is changed to "1." The values of the field could be any values, as is apparent to those skilled in the art, including other than binary values. For example, a "0" could indicate "compliance not yet evaluated," "1" could indicate "compliance validated," and "3" could indicate "the document failed to satisfy the requirement.

The image receiving device 118 may be linked to the host computer system 102 via the network 104 or a direct link and can thereby access the record to updated the field appropriately. Likewise, the compliance verification specialist may have a computing device 120 through which he accesses the record to make the updates.

Figure 1B:
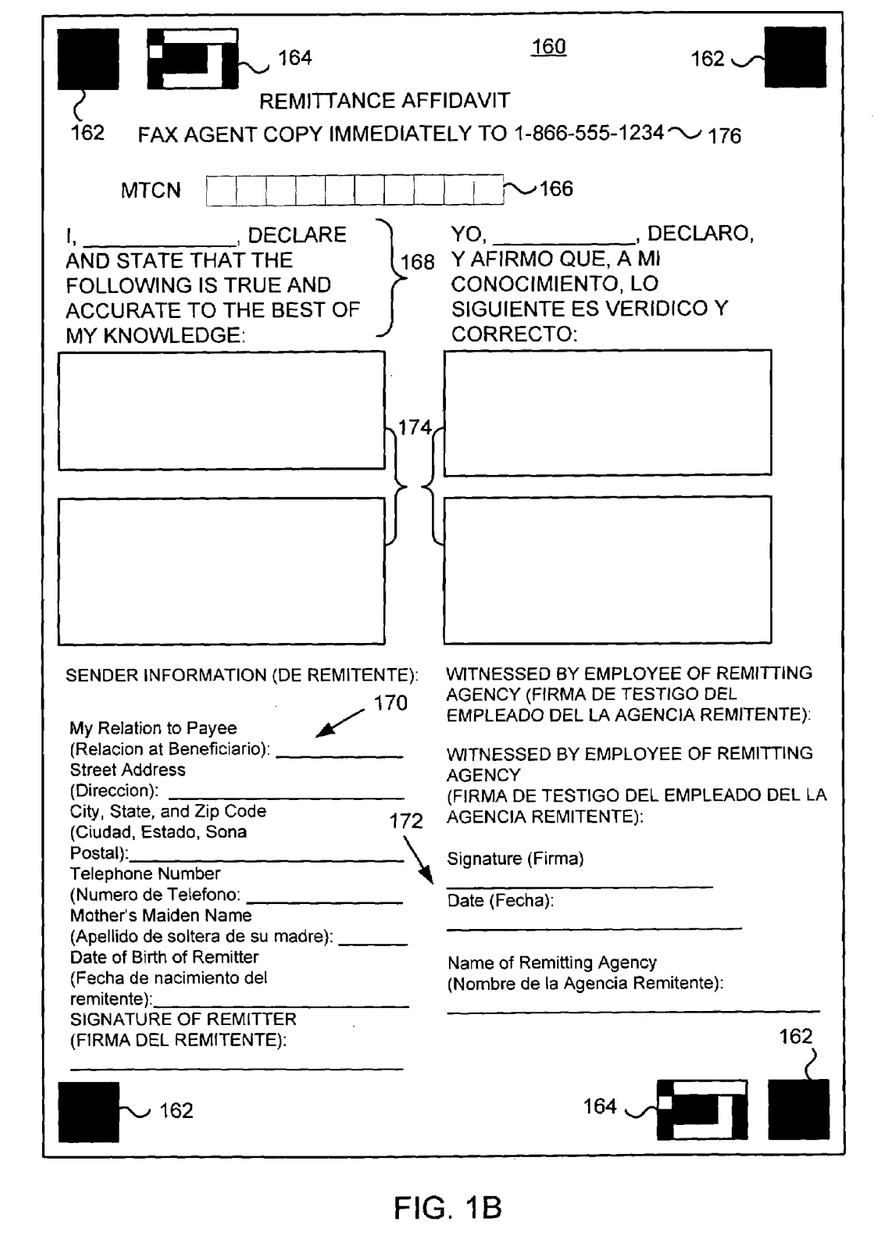
FIG. 1B illustrates an exemplary compliance document for initiating a money transfer to a regulated region.

Attention is directed to FIG. 1B, which illustrates a specific embodiment of a compliance document 160. This document may be necessary to comply with a requirement for sending money to a regulated region. This specific embodiment of a document may be used for in-person transfers, where a customer initiates the transfer from a money transfer location, or an on-line transfer, in which a customer initiates the transfer from a personal computer or the like. In either case, the customer signs a physical document and faxes it or scans it and emails it to the compliance verification location. At the compliance verification location, the document may be reviewed by a compliance verification specialist or by a scanning device and appropriate software.

To facilitate automated verification, the document 160 includes alignment indicators 162 that allow the document to be properly aligned for software evaluation. The document 160 also includes a template identifier 164, which may be a one-dimensional or two-dimensional bar code or other appropriate encoding arrangement, that assists in automated review of the document. The document 160 also includes a control number field 166 into which the customer or an attendant may enter a number that associates the document 160 with a transaction record.

The document 160 includes a number of text sections, some of which have blanks into which the customer enters information. For example, the document includes an acknowledgement section 168 into which the customer enters his name. The document also includes a personal information section 170 into which the customer enters information about himself, the recipient/payee, and/or their relationship. The personal information section also may include a signature block for the sender to sign. The document also includes a signature block 172 for the attendant or other witness to sign.

The document 160 also may include information blocks 174 that include a description of the requirement. For example, the information blocks 174 may explain a prohibition on sending more than a threshold amount of money to a single recipient or recipient address within a specific period of time. The information blocks 174 may be in multiple languages.

The document 160 also may include a fax number 176 to which the form may be faxed.

The document 160 may be printed at a money transfer location or at another location at which the customer initiates a transaction. In some embodiments the document is pre-printed.

Figure 2:
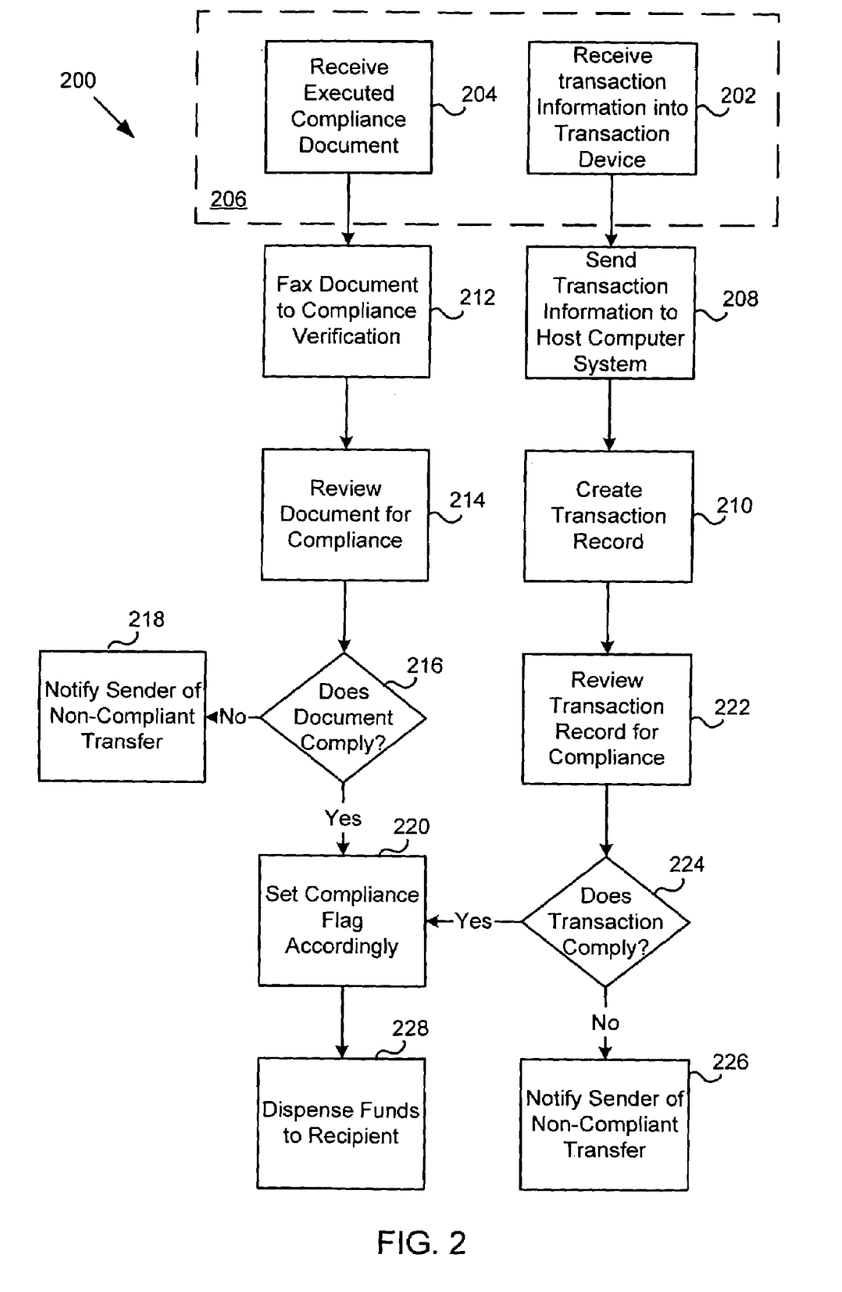
FIG. 2 illustrates a first exemplary method for transferring money to a regulated region.

Having described an exemplary system 100 according to embodiments of the invention, attention is directed to FIG. 2, which illustrates an exemplary method 200 according to embodiments of the invention. The method 200 may be embodied in the system 100 of FIG. 1A or other appropriate system. Those skilled in the art will appreciate that other methods according to embodiments of the invention may include more, fewer, or different steps than those illustrated and described here. Further, methods according to other embodiments may traverse the steps in orders different than that illustrated and described here.

The method 200 begins when a customer presents himself to a money transfer location for the purpose of sending money to a regulated region. Although the method 200 will be described in terms of a person initiating a money transfer from a physical money transfer location, those skilled in the art, in light of this disclosure, will realize that, in other embodiments, the customer may initiate the transfer from a "virtual" location, such as a web site. At block 202, the customer provides transaction information, which is entered into a transaction device. The transaction device may be any of the transaction devices discussed previously with respect to FIG. 1A or other appropriate device. The information may be provided by completing a transaction initiation form, giving the information to an attendant verbally, entering the information into a personal computer, or the like. Other examples are possible.

This being a transaction to a regulated region, the customer also completes a compliance document relating to the transaction. The compliance document may be the compliance document 160 discussed previously with respect to FIG. 1B or the like. The form may be available from the money transfer location or may be, for example, a form that the customer downloads from an Internet site, or the like. The actions at blocks 202 and 204, in this example, take place at a money transfer location 206; however this is not a requirement, as previously mentioned. Further, the actions of blocks 202 and 204 need not take place contemporaneously. For example, in a situation where the customer is sending from a money transfer location 206, an attendant may complete the transaction up to a point, then advise the customer that the recipient would not be able to pick up the funds until the customer completes and submits the required compliance document. In another example, the customer may complete the transaction from his residence using a personal computer, at which point the customer may be advised that he needs to download and submit the required compliance document before the recipient may receive the funds. Many such examples are possible. In either case the compliance document may not be sent for several days or several weeks or longer after the transaction is initiated.

At block 208, the transaction information is sent to the host computer system from the transaction device. At block 210, the transaction information is used to create a transaction record, which is stored for further processing. The transaction record may include fields that identify the transaction as one to a regulated region and for identifying whether compliance requirements have been completed, one of which compliance requirements is the completion of the compliance document. Thus, the transaction record may be "flagged" for further review or processing until additional actions are taken.

At block 212, in this example, an attendant at the money transfer location 206 faxes the completed compliance document to a compliance verification location, which may be the same location as the host computer system. As previously stated, in other embodiments, this action may represent the customer faxing the compliance document to the compliance verification location from a personal fax machine or scanner having initiated the transaction from a personal computer or at a money transfer location.

At block 214, the compliance document is reviewed for compliance with the requirement. The review may include merely reviewing whether the customer signed the compliance document or could include a substantive review of the content of the compliance document. In some embodiments, the review is accomplished by a compliance verification specialist. In other embodiments, the image of the compliance document is reviewed in an automated fashion. For example, a fax/imaging device may compare the compliance document to a template to determine where marks appear on the compliance document to determine if the customer completed the required blanks. The same type of review may be done in software, for example, if the customer scans the compliance document and emails the resulting image file. In some embodiments, the content of the compliance document is viewed substantively, which may include converting the customer's markings on the compliance document to computer-readable text and then evaluating the content. In other embodiments, the compliance document includes a number of "bubbles" or check boxes that the customer completes, in which case the content may be substantively evaluated without needing to use optical character recognition or the like to convert the content to computer-readable text. Many other such embodiments are possible and apparent to those skilled in the art in light of this disclosure.

At block 216, a decision is made, either by a compliance verification specialist, software, or the like, whether the compliance form satisfies the requirement. If the requirement is not satisfied, the sender is notified at block 218 that the transaction cannot be completed. The notification may be by email, telephone call, letter, or the like. If the compliance document does satisfy the requirement, then the transaction record is appropriately annotated to so indicate. This may include setting a flag, changing the value of a field, or the like. This action takes place at block 220.

At block 222, the transaction record is reviewed for other compliance items and possibly compared to other transaction records to evaluate compliance with substantive requirements. For example, if a requirement prohibits the transfer of funds in excess of a specific threshold to the same person or address in a given period of time, the subject transaction record may be compared with other transaction records and/or transfer amounts aggregated to determine if the requirement has been satisfied. This action may be accomplished by software, a compliance verification specialist, or the like.

At block 224, a decision is made whether the transaction complies substantively with the requirement. If not, the sender is notified at block 226, which may be by email, letter, telephone call, or the like. If so, the transaction record is appropriately annotated at block 220 as previously described.

At block 228, a recipient in the regulated region requests to receive the transferred funds and they are dispensed, as known in the art. In this specific embodiment, this action is accomplished only after the two reviews described above are completed and the transaction record so identified.

Those skilled in the art will appreciate that the specific embodiment described here is merely exemplary. For example, block 220 may include actions other than annotating a transaction record. In some embodiments, the transaction record is "queued" into a compliance review queue, for example, and only released from the queue when all compliance review items are complete. Thus, the record may not necessarily be changed. Those skilled in the art will realize many other possible embodiments in light of this disclosure.

Figure 3:
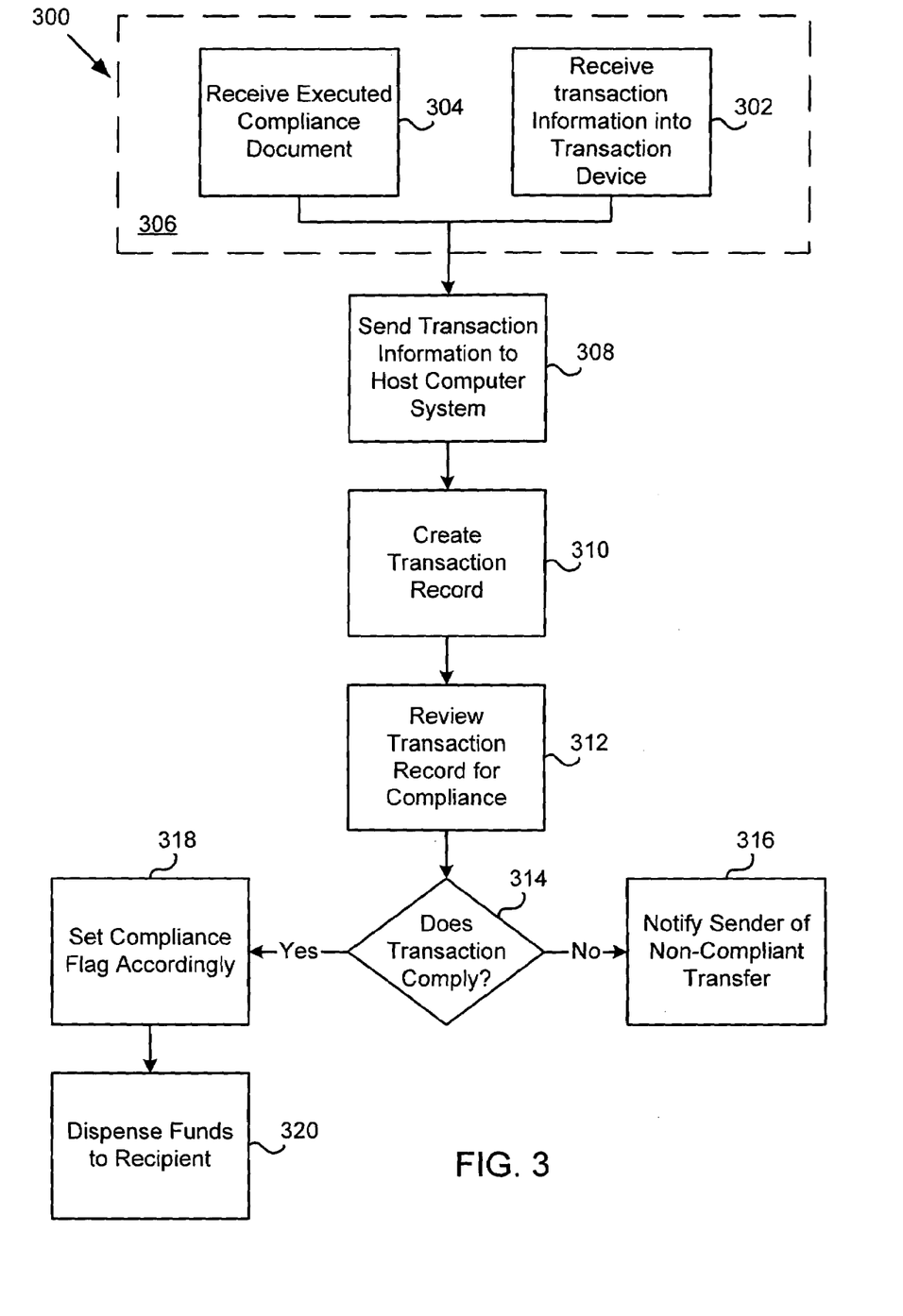
FIG. 3 illustrates a second exemplary method for transferring money to a regulated region.

Having described a first example of a method 200 according to embodiments of the invention, attention is directed to FIG. 3, which illustrates a second example of a method 300 of transferring money to a regulated region according to embodiments of the invention. While the first method 200 generally relates to reviewing faxed or scanned images of a compliance document, the second method 300 generally relates to reviewing information such as a customer's signature that is captured using a capture device. As with the previous method 200, those skilled in the art will appreciate that the method 300 is merely exemplary and other methods according to other embodiments may in include more, fewer, or different steps than those illustrated and described here. Further, other methods according to other embodiments may traverse the steps illustrated and described here in different orders. The method 300 may be implemented in the system 100 or FIG. 1A or other appropriate system.

The method 300 begins at block 302 at which point a customer provides transaction information that is entered into a transaction device. The actions taken at this block are similar to those taken at block 202 of FIG. 2. At block 304, the customer executes a compliance document. In this embodiment, however, the compliance document exists electronically, and executing the document includes signing the document electronically using a signature capture pad or the like. This action also may include selecting electronic boxes, selecting items from an electronic menu, filling in blanks, and/or the like using a capture pad or other input device. In some embodiments, these actions take place at a money transfer location 306. In some embodiments, the customer completes the required information using a personal computer or the like. Other examples are possible.

At block 308 the transaction information, which includes the electronically-completed/executed document, is sent to a host computer system, and a transaction record is created at block 310. The transaction record may include any or all of the items discussed previously with respect to the method 200 of FIG. 2, including fields whose values indicate the status of compliance with requirements.

At block 312, the transaction record is reviewed for compliance. This may include the review items discussed previously with respect to blocks 214 and 222 of FIG. 2. Both may be completed automatically using software or using a compliance verification specialist.

At block 314 a decision is made whether the transaction complies with requirements affecting the transaction. If not, the sender is notified at block 316. If so, the transaction record is appropriately updated to signify compliance. As a result, funds may be dispensed at block 320 upon request of a recipient.

Those skilled in the art will appreciate that the foregoing description does not preclude a number of potential embodiments for complying with regulatory requirements associated with wire transfers. For example, some customers may be able to execute a document that remains "on file" with the service provider. Subsequent transfers by the customer may be associated with the completed form through an identification card, a "frequent customer" card, a loyalty card, a customer number, and/or the like. Further, similar cards and/or numbers may be used to pre-populate a number of fields that need to be completed on some compliance documents and/or associate a transaction with a customer for whom a completed form need not be reviewed. In other words, the customer completes a form at a transfer location, but the form need not be reviewed at a compliance review location before the transaction is completed. Many such embodiments exist.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to compliance requirements related to wire transfers to regulated regions. For example, the present invention may be used to comply with requirements that exist for a number of different reasons. Accordingly, the above description should not be taken as limiting the scope of the invention, which is defined in the following claims.

What is claimed is:

1. A method of facilitating a money transfer to a region for which compliance with a requirement requires execution of a document, the method comprising:
   receiving transaction information at a host computer system from a transaction processing device at a transaction origination location, wherein the transaction information relates to a money transfer to the region;
   at the host computer system, storing at least a portion of the transaction information as a money transfer record, wherein the record includes a field whose value indicates the status of compliance with the requirement;
   receiving at a compliance verification location an image of at least a portion of the document;
   evaluating the document to determine whether the document evidences compliance with the requirement;
   setting the value of the field to indicate compliance with the requirement; and completing the money transfer, upon request or a recipient, if the value of the field indicates compliance with the requirement;
   wherein the requirement restricts the transfer of money to the region in the absence of execution of the document.

2. The method of claim 1, wherein receiving at a compliance verification location an image of at least a portion of the document comprises receiving, as part of the transaction information, at least a digital signature of a money transfer originator.

3. The method of claim 1, wherein receiving at a compliance verification location an image of at least a portion of the document comprises receiving, as part of the transaction information, at least an electronically-captured signature image of a money transfer originator.

4. The method of claim 1, wherein receiving at a compliance verification location an image of at least a portion of the document comprises receiving a facsimile of at least a portion of the document, the method further comprising reviewing the document for evidence of compliance with the requirement.

5. The method of claim 1, wherein evaluating the document to determine whether the document evidences compliance with the requirement comprises using an image analysis device to review the document.

6. The method of claim 5, wherein the image analysis device comprises a selection from the group consisting of a facsimile machine and a computer.

7. The method of claim 1, wherein evaluating the document to determine whether the document evidences compliance with the requirement comprises a compliance review specialist reviewing the document.

8. The method of claim 1, wherein the document includes hand-written content and wherein evaluating the document to determine whether the document evidences compliance with the requirement comprises evaluating the meaning of the hand-written content.

9. The method of claim 1, wherein the document includes hand-written content and wherein evaluating the document to determine whether the document evidences compliance with the requirement comprises evaluating only the presence of the hand-written content.

10. A system for performing a wire transfer to a region for which compliance with a requirement requires execution of a document, the system, comprising:
    a host computer system having programming that programs the host computer system to:
       receive transaction information from a transaction processing device at a transaction origination location, wherein the transaction information relates to a money transfer to the region; and
       store at least a portion of the transaction information as a money transfer record, wherein the record includes a field whose value indicates the status of compliance with the requirement
    an image receiving arrangement configured to receive an Image of at least a portion of the document and evaluate the document to determine whether the document evidences compliance with the requirement; and
    an interface between the image receiving arrangement and the host computer system through which the image receiving arrangement can set the value of the field to indicate compliance with the requirement;
    wherein the requirement restricts the transfer of money to the region in the absence of execution of the document.

11. The system of claim 10, wherein the transaction information includes at least an electronically-captured signature image of a money transfer originator.

12. The system of claim 10, wherein the image receiving arrangement is configured to receive at least a portion of the document in the form of a facsimile from a facsimile machine.

13. The system of claim 10, wherein the document includes hand-written content and wherein the image receiving arrangement is configured to evaluated the hand-written content.

14. The system of claim 10, wherein the document includes hand-written content and wherein the image receiving arrangement is configured to evaluated only the presence of the hand-written content.

15. The system of claim 10, wherein the image receiving arrangement comprises a selection from the group consisting of:
a facsimile machine; and
a computing device.

16. The system of claim 10, wherein the image receiving arrangement and the interface between the image receiving arrangement and the host computer system are comprised by the host computer system.

17. A computer-readable medium having stored thereon computer-executable instructions for performing a method of facilitating a wire transfer to a region for which compliance with a requirement requires execution of a document, comprising:
instructions for receiving transaction information from a transaction processing device at a transaction origination location, wherein the transaction information relates to a money transfer to the region;
instructions for storing at least a portion of the transaction information as a money transfer record, wherein the record includes a field whose value indicates the status of compliance with the requirement;
instructions for receiving at a compliance verification location an image of at least a portion of the document;
instructions for evaluating the document to determine whether the document evidences compliance with the requirement; and
instructions for setting the value of the field to indicate compliance with the requirement;
wherein the requirement restricts the transfer of money to the region in the absence of execution of the document.

18. A system for performing a wire transfer to a region for which compliance with a requirement requires execution of a document, the system, comprising:
means for receiving transaction information from a transaction processing device a transaction origination location, wherein the transaction information relates to a money transfer to the region;
means for storing at least a portion of the transaction information as a money transfer record, wherein the record includes a field whose value indicates the status of compliance with the requirement;
means for receiving an image of at least a portion of the document;
means for evaluating the document to determine whether the document evidences compliance with the requirement; and
means for setting the value of the field to indicate compliance with the requirement;
wherein the requirement restricts the transfer of money to the region in the absence of execution of the document.

19. A method of facilitating a transfer of value for which compliance with a requirement requires execution of a document, the method comprising:
receiving transaction information at a host computer system from a transaction processing device at a transaction origination location, wherein the transaction information relates to the transfer of value;
at the host computer system, storing at least a portion of the transaction information as a value transfer record;
receiving at a compliance verification location an image of at least a portion of the document;
evaluating the document to determine whether the document evidences compliance with the requirement;
processing the record in a first manner only if the document evidences compliance with the requirement; and
processing the record in a second manner if the document evidences non-compliance with the requirement;
wherein the requirement restricts the transfer of value to the region in the absence of execution of the document.

20. The method of claim 19, wherein the first manner comprises using the transaction record to complete the transfer and wherein the second manner comprises rejecting the transfer.

* * * * *

UNITED STATES PATENT AND TRADEMARK OFFICE
CERTIFICATE OF CORRECTION

PATENT NO. : 7,213,744 B2  
APPLICATION NO. : 10/940417  
DATED : May 8, 2007  
INVENTOR(S) : Michael J. Michelsen et al.

Page 1 of 1

It is certified that error appears in the above-identified patent and that said Letters Patent is hereby corrected as shown below:

Column 5, line 62, delete "finds" and insert --funds--

Column 13, claim 18, line 40, after "device" insert --at--

Signed and Sealed this

Twentieth Day of November, 2007

JON W. DUDAS  
*Director of the United States Patent and Trademark Office*

(12) EX PARTE REEXAMINATION CERTIFICATE (10114th)
United States Patent
Michelsen et al.

(10) Number: US 7,213,744 C1
(45) Certificate Issued: Apr. 14, 2014

(54) REGULATED WIRE TRANSFER COMPLIANCE SYSTEMS AND METHODS

(75) Inventors: Michael J. Michelsen, Arvada, CO (US); Joseph Cachey, Denver, CO (US); Phyllis Skene-Stimac, Parker, CO (US)

(73) Assignee: The Western Union Company, Englewood, CO (US)

Reexamination Request:
No. 90/012,190, Mar. 13, 2012

Reexamination Certificate for:
Patent No.: 7,213,744
Issued: May 8, 2007
Appl. No.: 10/940,417
Filed: Sep. 13, 2004

Certificate of Correction issued Nov. 20, 2007

(51) Int. Cl.
*G06Q 40/00* (2012.01)
(52) U.S. Cl.
USPC .............................. 235/379; 235/380; 705/17
(58) Field of Classification Search
None
See application file for complete search history.

(56) References Cited

To view the complete listing of prior art documents cited during the proceeding for Reexamination Control Number 90/012,190, please refer to the USPTO's public Patent Application Information Retrieval (PAIR) system under the Display References tab.

*Primary Examiner* — Karin Reichle (57) ABSTRACT

A method of facilitating a money transfer to a region for which compliance with a requirement requires execution of a document. The method includes receiving transaction information at a host computer system from a transaction processing device at a transaction origination location. The transaction information relates to a money transfer to the region. The method also includes storing at least a portion of the transaction information as a money transfer record. The record includes a field whose value indicates the status of compliance with the requirement. The method also includes receiving an image of at least a portion of the document, evaluating the document to determine whether the document evidences compliance with the requirement, setting the value of the field to indicate compliance with the requirement, and completing the money transfer, upon request or a recipient, if the value of the field indicates compliance with the requirement.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-18 is confirmed.

Claims 19-20 are cancelled.

\* \* \* \* \*